United States Patent
Hayashi

(10) Patent No.: US 10,453,235 B2
(45) Date of Patent: Oct. 22, 2019

(54) IMAGE PROCESSING APPARATUS DISPLAYING IMAGE OF VIRTUAL OBJECT AND METHOD OF DISPLAYING THE SAME

(71) Applicant: CANON KABUSHIKI KAISHA, Tokyo (JP)

(72) Inventor: Masayuki Hayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 15/821,442

(22) Filed: Nov. 22, 2017

(65) Prior Publication Data
US 2018/0158222 A1     Jun. 7, 2018

(30) Foreign Application Priority Data

Dec. 1, 2016   (JP) .................. 2016-234154

(51) Int. Cl.
| | |
|---|---|
| *G06T 11/60* | (2006.01) |
| *G06F 3/14* | (2006.01) |
| *G06T 7/70* | (2017.01) |
| *G06F 3/01* | (2006.01) |
| *G06F 3/03* | (2006.01) |
| *G06F 3/0484* | (2013.01) |
| *G06F 3/0346* | (2013.01) |

(52) U.S. Cl.
CPC ........... *G06T 11/60* (2013.01); *G06F 3/011* (2013.01); *G06F 3/017* (2013.01); *G06F 3/0304* (2013.01); *G06F 3/0346* (2013.01); *G06F 3/04845* (2013.01); *G06F 3/14* (2013.01); *G06T 7/70* (2017.01)

(58) Field of Classification Search
None
See application file for complete search history.

(56) References Cited

U.S. PATENT DOCUMENTS

| | | | | |
|---|---|---|---|---|
| 2005/0234333 | A1* | 10/2005 | Takemoto | ............ G02B 27/017 |
| | | | | 600/426 |
| 2006/0044327 | A1* | 3/2006 | Okuno | ................... G06F 3/011 |
| | | | | 345/626 |
| 2007/0247393 | A1* | 10/2007 | Kuroki | ................... G06F 3/016 |
| | | | | 345/8 |

(Continued)

FOREIGN PATENT DOCUMENTS

| | | |
|---|---|---|
| JP | 2009-25918 A | 2/2009 |
| JP | 2009-169622 A | 7/2009 |

*Primary Examiner* — James A Thompson
(74) *Attorney, Agent, or Firm* — Canon U.S.A., Inc. IP Division

(57) ABSTRACT

An apparatus includes: a detection unit that detects a position and an orientation of a real object with respect to a viewpoint of a user; a determination unit that determines whether the user is holding the real object; and a display control unit that displays a virtual object corresponding to the real object based on the position and the orientation of the real object. When the user is not holding the real object, the display control unit displays the virtual object in a first form in which a shape of the real object can be visually recognized. When the user is holding the real object, the display control unit displays the virtual object in a second form in which the shape of the real object on which the virtual object is superimposed cannot be visually recognized.

17 Claims, 9 Drawing Sheets

(56) References Cited

U.S. PATENT DOCUMENTS

| | | | |
|---|---|---|---|
| 2009/0102845 A1* | 4/2009 | Takemoto | G06T 19/006 345/426 |
| 2011/0304640 A1* | 12/2011 | Noge | G06T 19/006 345/589 |
| 2013/0286004 A1* | 10/2013 | McCulloch | G06T 19/006 345/419 |
| 2013/0328762 A1* | 12/2013 | McCulloch | G02B 27/017 345/156 |
| 2015/0371444 A1* | 12/2015 | Hara | G02B 27/017 345/633 |
| 2016/0189426 A1* | 6/2016 | Thomas | G06T 19/006 345/633 |
| 2017/0161957 A1* | 6/2017 | Yajima | G06K 9/00355 |
| 2017/0201709 A1* | 7/2017 | Igarashi | G06F 3/048 |
| 2017/0309071 A1* | 10/2017 | Benko | G06F 3/011 |
| 2018/0189354 A1* | 7/2018 | Paine | G06F 3/013 |
| 2019/0116448 A1* | 4/2019 | Schmidt | H04S 7/304 |

\* cited by examiner

IMAGE PROCESSING APPARATUS DISPLAYING IMAGE OF VIRTUAL OBJECT AND METHOD OF DISPLAYING THE SAME

BACKGROUND OF THE INVENTION

Field of the Invention

The aspect of the embodiments relates to an image processing apparatus that displays an image of a virtual object and a method of displaying the same.

Description of the Related Art

In recent years, reduction in an evaluation period and cost savings using a prototype have been popular in design and manufacturing fields. Therefore, in order to evaluate workability such as ease of construction and ease of maintenance, a mixed reality (MR) system has been introduced using design data created with a computer-aided design (CAD) system.

Examples of evaluation using an MR system include evaluation of whether work can be carried out without causing a tool to interfere with something other than a target component. In one embodiment, an MR system for performing such evaluation is required to have a function of allowing a person (user) who experiences a system to hold and move a virtual object (for example, tool). In that case, by preparing a simple-shape real object a user can actually hold and move and displaying a virtual object image to be superimposed on the real object, a feeling of just like holding and moving the virtual object can be provided to the user.

In such an MR system, however, when a real object is completely concealed by a virtual object image, a user who tries to hold the real object while observing only the virtual object may not be able to hold the real object successfully. For example, when only a handle portion of a tool is prepared as a real object and the entire tool including a tool tip is displayed as a virtual object, the user may try to hold and move a tip portion of the tool that cannot actually be held.

Japanese Patent Laid-Open No. 2009-169622 discloses that when it is determined that a specified region of a user's body is going to touch a virtual object, the user is informed of presence of a real object through translucent display of the virtual object that is displayed in superimposition on the real object. Japanese Patent Laid-Open No. 2009-25918 discloses that when a region of a user's body is brought close to a real object, transparency of a virtual space image is increased, and when a time period during which a distance between the region of the user's body and the real object is equal to or less than a threshold becomes equal to or longer than a predetermined time period, transparency of the virtual space image is returned to opaque.

A technique disclosed in Japanese Patent Laid-Open No. 2009-169622 and Japanese Patent Laid-Open No. 2009-25918 does not allow the user to grasp a shape of the real object unless bringing the specified region of the user's body close to the virtual object displayed in superimposition on the real object. That is, when the virtual object is displayed such that the virtual object is superimposed on the real object, since the user cannot see the real object, the user may not be able to appropriately perform an approaching operation for holding the real object. The technique disclosed in Japanese Patent Laid-Open No. 2009-169622 allows the user, when the user brings the specified region of the user's body close to the virtual object, to grasp the shape of the real object, improving ease of holding the real object. However, under this scheme, the real object remains to be displayed even after the user holds the real object. It is therefore difficult for the user to obtain a feeling of holding the virtual object, and a feeling of absorption is spoiled. Furthermore, translucency of the virtual object may reduce visibility of the virtual object and make it difficult to evaluate workability using the virtual object.

Also, the technique disclosed in Japanese Patent Laid-Open 2009-169622 causes a virtual object, after a region of a user's body approaches a real object and the virtual object is displayed translucently, to switch to opaque display after a predetermined time period elapses. Therefore, the virtual object can become opaque only by the user bringing the region of the user's body close to the real object, even before actually holding the real object. In this case, it becomes difficult for the user to hold the real object.

Therefore, an aspect of the embodiments is to present, to a user, an image that allows the user to easily hold a real object on which a virtual object is superimposed and to easily observe the virtual object after holding the real object.

SUMMARY OF THE INVENTION

According to one aspect of the embodiments, an apparatus includes: a detection unit configured to detect a position and an orientation of a real object with respect to a viewpoint of a user; a determination unit configured to determine whether the user is holding the real object; and a display control unit configured to display a virtual object corresponding to the real object based on the position and the orientation of the real object. When the user is not holding the real object, the display control unit displays the virtual object in a first form in which a shape of the real object can be visually recognized. When the user is holding the real object, the display control unit displays the virtual object in a second form in which the shape of the real object on which the virtual object is superimposed cannot be visually recognized.

Further features of the disclosure will become apparent from the following description of exemplary embodiments (with reference to the attached drawings).

DESCRIPTION OF THE EMBODIMENTS

Modes for carrying out the aspect of the embodiments will be described in detail below with reference to the accompanying drawings. Note that embodiments described below are one example as an implementation unit of the disclosure. The embodiments should be corrected or changed as appropriate depending on a configuration of an apparatus to which the disclosure is applied and various conditions. The disclosure is not limited to the following embodiments.

Figure 1:
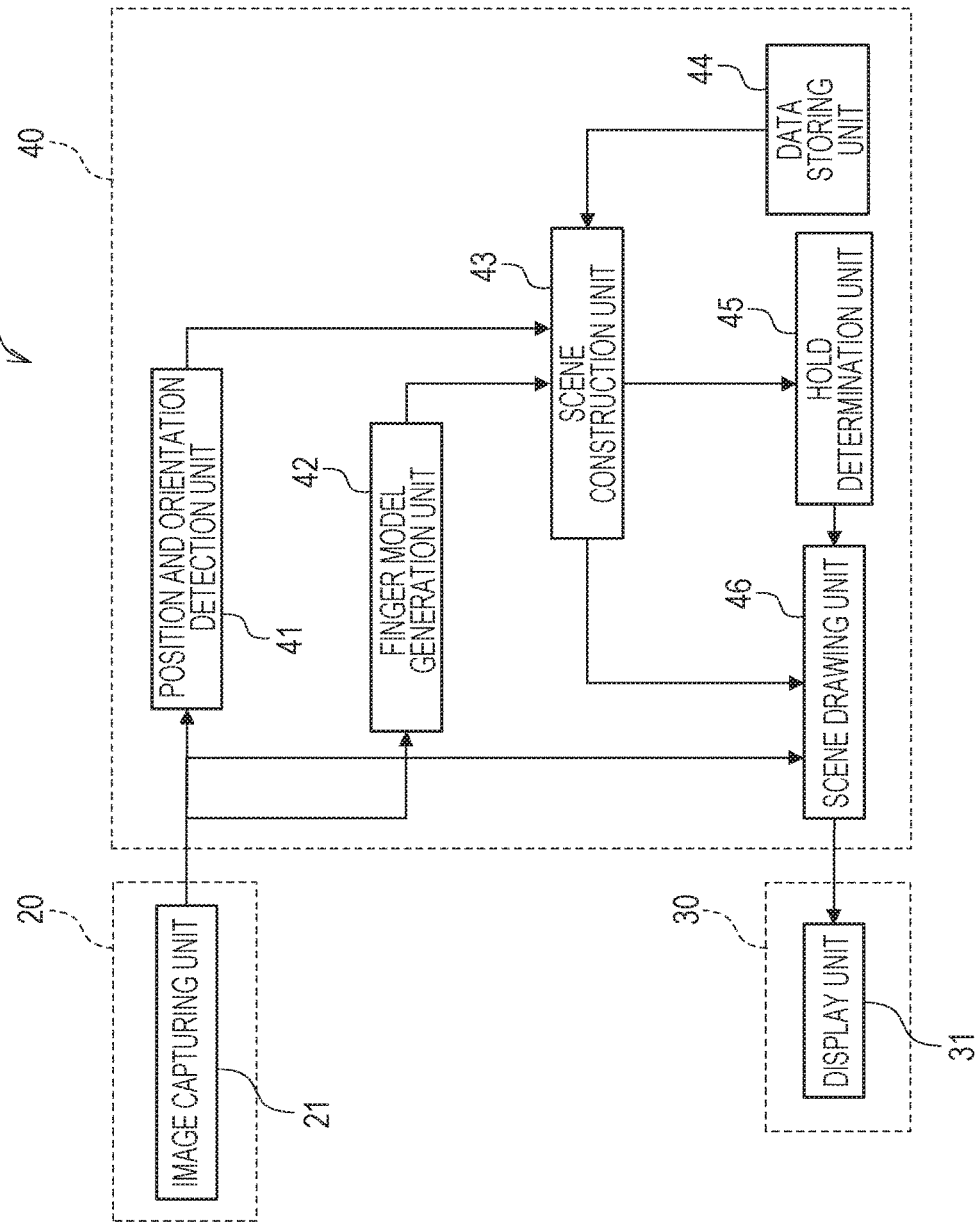
FIG. 1 is a diagram illustrating a functional configuration of a mixed reality system in a first embodiment.

FIG. 1 is a diagram illustrating a configuration example of a mixed reality system (MR system) 10 in the present embodiment. The MR system 10 in the present embodiment is an image processing system for presenting, to a person who experiences a system (user), mixed reality space (MR space) obtained by mixing real space and virtual space. The present embodiment describes presenting the MR space to the user by displaying a combined image obtained by combining an image of real space and an image of virtual space drawn by computer graphics (CG).

The MR system 10 includes an image capturing device 20, a display device 30, and an information processing apparatus 40. The information processing apparatus 40 can combine an image of real space imported from the image capturing device 20 with an image of virtual space generated in the information processing apparatus 40, and then output the combined image to the display device 30 as a mixed reality image (MR image). Note that the aspect of the embodiments relates to an information processing apparatus that displays an image of virtual space, and is not limited to the MR system that displays the MR image obtained by combining the image of real space with the image of virtual space. That is, the aspect of the embodiments is also applicable to a virtual reality (VR) system that presents only the image of virtual space to a user.

The image capturing device 20 includes an image capturing unit 21. The image capturing unit 21 captures images of real space continuously on a time-series basis, and then outputs the captured images of real space to the information processing apparatus 40. The image capturing unit 21 may include a stereo camera including two cameras fixed with respect to each other such that real space in a line-of-sight direction can be captured from a user's viewpoint position.

The display device 30 includes a display unit 31. The display unit 31 displays the MR image output from the information processing apparatus 40. The display unit 31 may include two displays disposed corresponding to right and left eyes of the user. In this case, an MR image for the user's left eye is displayed on the display corresponding to the left eye, whereas an MR image for the user's right eye is displayed on the display corresponding to the right eye.

The display device 30 is, for example, a head-mounted display device (HMD). The display device 30 is however not limited to the HMD but may be a handheld display (HHD). The HHD is a display to be held by hand. That is, the display device 30 may be a display with which the user observes an image by the user holding and looking into the display device 30 as binoculars. Furthermore, the display device 30 may be a display terminal such as a tablet and a smartphone.

The information processing apparatus 40 includes a position and orientation detection unit 41, a finger model generation unit 42, a scene construction unit 43, a data storing unit 44, a hold determination unit 45, and a scene drawing unit 46.

Figure 2A:
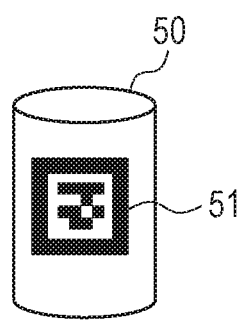
FIGS. 2A and 2B are examples of a marker and a virtual object, respectively.
Figure 2B:
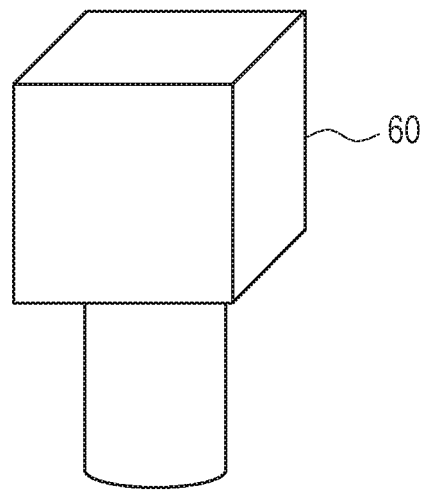

The position and orientation detection unit 41 detects a position and orientation of an object in real space (real object). Specifically, the position and orientation detection unit 41 extracts a marker attached to the real object from the image of real space captured by the image capturing device 20. The position and orientation detection unit 41 then detects the position and orientation of the real object based on a position and orientation of the marker. FIG. 2A illustrates an example of the marker. As illustrated in this FIG. 2A, the present embodiment describes a case where a rectangular marker 51 is attached to a cylindrical real object 50 the user can actually hold and operate. The information processing apparatus 40 performs display control to generate an image in which a virtual object 60 of a shape illustrated in FIG. 2B is placed on virtual space (virtual image) in superimposition on the real object 50 at a position and orientation corresponding to a position and orientation of the real object 50, and to display the generated virtual image on the display unit 31 of the display device 30.

Note that the present embodiment describes a case where the position and orientation of the real object 50 is detected by image processing. However, the position and orientation may be measured using infrared light, the position and orientation may be measured using an ultrasonic wave, and the position and orientation may be measured using a magnetic sensor. Furthermore, the position and orientation may be measured using a depth sensor, and the position and orientation may be measured mechanically. The present embodiment describes an example in which the position and orientation of the real object 50 with respect to the image capturing device 20 on real space is detected. However, the position and orientation of the image capturing device 20 and the real object 50 with respect to the world coordinate system determined on real space may be detected.

The finger model generation unit 42 estimates an area of a part of the user's body (finger area) from the image of real space captured by the image capturing device 20. The finger model generation unit 42 then generates a planar or three-dimensional geometric model (finger model) obtained by modeling a shape of the region. In the present embodiment, the geometric model can be a polygon model obtained by approximating a shape of a target object with a plurality of polygons. For example, the finger model generation unit 42 may extract the finger area by extracting flesh color from an image and generate a polygon model that fits the finger area. Alternatively, the finger model generation unit 42 may learn the shape of the finger in advance from a large number of hand images, estimate the finger shape from the images, and generate the polygon model.

The scene construction unit 43 places the geometric model of the virtual object 60 and the geometric model of the real object 50 stored in the data storing unit 44 to be described later in a scene (on virtual space) at a position and orientation corresponding to the position and orientation of the real object 50 detected by the position and orientation detection unit 41. The scene construction unit 43 further places, in the scene, the finger model generated by the finger model generation unit 42 in alignment with the finger area detected from the image of real space. Thus, the scene construction unit 43 places each of the geometric models described above on virtual space in association with the corresponding position and orientation on real space. Note that in the present embodiment, a position and orientation of a virtual camera to be used when drawing a scene agrees with a position and orientation of the image capturing device 20.

The data storing unit 44 stores the geometric model obtained by modeling the shape of the real object 50, the attachment position and orientation of the marker 51 with respect to the real object 50, and data of the virtual object 60 corresponding to the real object 50. Here, the data of the virtual object 60 can include the geometric model obtained by modeling the shape of the virtual object 60, color and texture, and material data that stores transparency information. In the following descriptions, a form for drawing the virtual object 60 placed on virtual space based on the material data stored in the data storing unit 44 is referred to as "prearranged drawing form."

The hold determination unit 45 determines whether the user is actually holding the real object 50. In the present embodiment, the hold determination unit 45 determines whether the user is holding the real object 50 by determining whether a region of the user's body is in contact with the real object 50.

Specifically, the hold determination unit 45 makes a contact determination between the finger model and the geometric model of the real object 50 placed in the scene constructed by the scene construction unit 43. Then, upon determination that the finger model and the geometric model of the real object 50 are in contact with each other as a result of the contact determination, the hold determination unit 45 determines that the user is holding the real object 50. On the other hand, upon determination that the finger model and the geometric model of the real object 50 are not in contact with each other, the hold determination unit 45 determines that the user is not holding the real object 50.

The scene drawing unit 46 generates a virtual image obtained by drawing the scene constructed by the scene construction unit 43 based on the determination result made by the hold determination unit 45. The scene drawing unit 46 then combines the image of real space captured by the image capturing device 20 with the virtual image to generate an MR image.

Figure 3A:
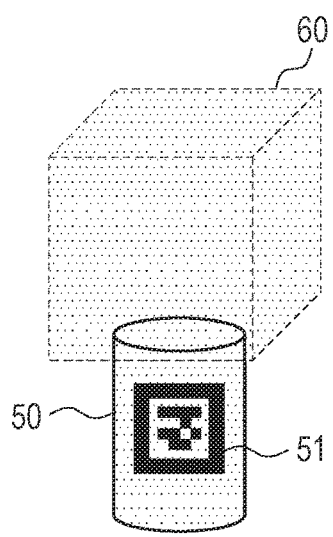
FIGS. 3A and 3B are each an example of a mixed real image.

FIG. 3A is an example of a schematic view of the MR image generated by the scene drawing unit 46. When the hold determination unit 45 determines that the user is not holding the real object 50, the scene drawing unit 46 draws the virtual object 60 in a drawing form illustrated in FIG. 3A. Here, the drawing form illustrated in FIG. 3A is a drawing form in which when combined with the image of real space, both of the shape of the virtual object 60 and the shape of the real object 50 on which the virtual object 60 is superimposed can be recognized. In the following descriptions, the drawing form illustrated in FIG. 3A is referred to as "translucent drawing form." Here, a state where a shape of an object can be recognized is a state where at least the shape of the object can be determined, and visibility of the object such as color and texture may be low. Examples of the translucent drawing form include a method of drawing an object with transparency of the material data of the virtual object 60 increased. The translucent drawing form is however not limited to the above method.

Figure 3B:
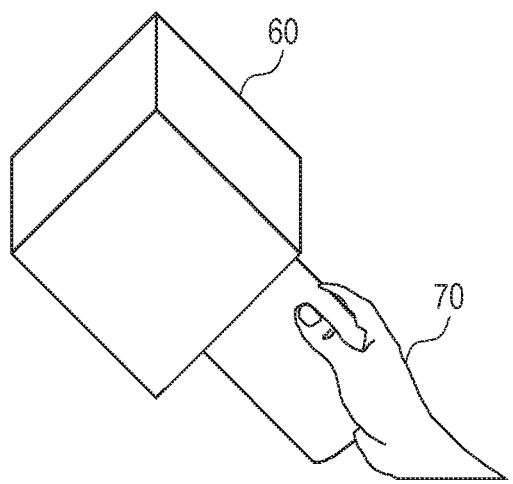

On the other hand, when the hold determination unit 45 determines that the user is holding the real object 50, the scene drawing unit 46 draws the virtual object 60 in the prearranged drawing form illustrated in FIG. 3B. This prearranged drawing form is a drawing form in which the virtual object 60 is drawn opaquely. The prearranged drawing form is a drawing form in which, when combined with the image of real space, the shape of the real object 50 on which the virtual object 60 is superimposed is hidden by the image of the virtual object 60 and cannot be recognized. That is, it can be said that the prearranged drawing form is a drawing form in which the virtual object 60 having good visibility can be observed, and not only the shape of the virtual object 60 but also color, texture, and the like can be observed appropriately. Also, in this prearranged drawing form, the virtual object 60 is drawn just like a user's hand 70 is holding the virtual object 60, and a good feeling of absorption can be provided to the user.

Figure 4:
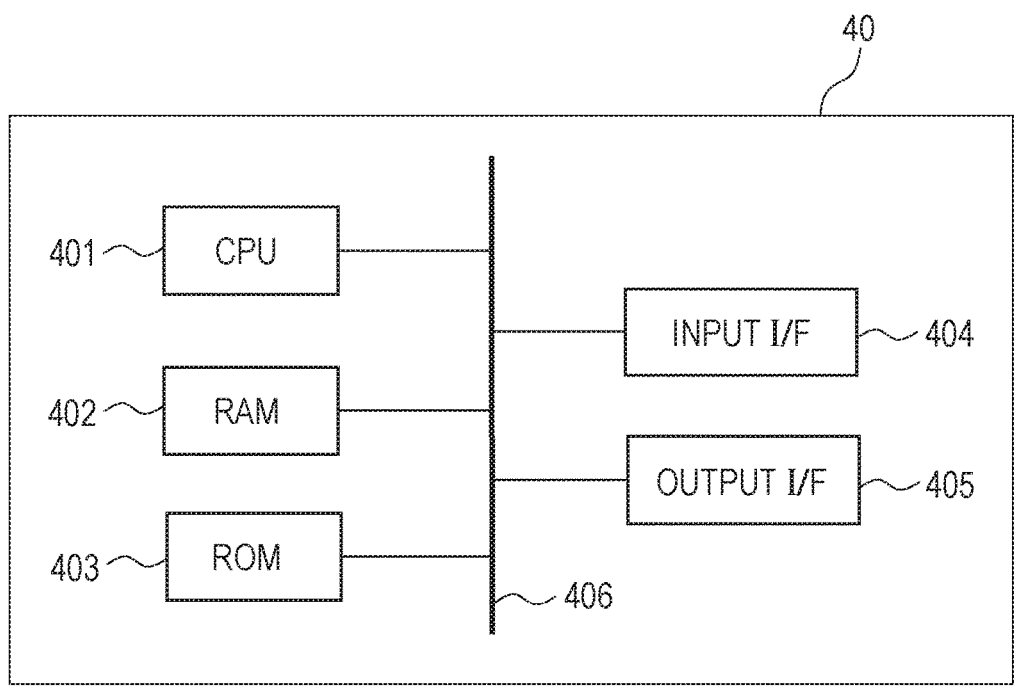
FIG. 4 is a diagram illustrating an example of a hardware configuration of an information processing apparatus.

FIG. 4 is a diagram illustrating an example of a hardware configuration of the information processing apparatus 40.

The information processing apparatus 40 includes a central processing unit (CPU) 401, a random-access memory (RAM) 402, a read-only memory (ROM) 403, an input interface (I/F) 404, an output I/F 405, and a system bus 406.

The CPU 401 is a processor that controls an operation in the information processing apparatus 40 as a whole, and controls components (402 to 405) via the system bus 406. The RAM 402 includes an area for temporarily storing a program and data loaded from the ROM 403 or an unillustrated external storage medium. The RAM 402 further includes an area for temporarily storing data received from an external device via the input I/F 404. The RAM 402 also includes a work area to be used when the CPU 401 performs each process.

The ROM 403 stores information such as a control program, various application programs, and data. The CPU 401 can implement a function of each unit of the information processing apparatus 40 illustrated in FIG. 1 by loading a program from the ROM 403 to the RAM 402 and executing the loaded program.

The input I/F 404 inputs an input signal from an external device in a format the information processing apparatus 40 can process. For example, when the external device is the image capturing device 20, the input I/F 404 inputs an image of real space captured by the image capturing device 20. The output I/F 405 outputs an output signal to an external device in a format the external device can process. For example, when the external device is the display device 30, the output I/F 405 outputs an MR image to the display device 30.

As described above, a function of each unit of the information processing apparatus 40 illustrated in FIG. 1 can be implemented by the CPU 401 executing a program. However, the information processing apparatus 40 illustrated in FIG. 1 may be configured such that at least part of the units of the information processing apparatus operates as dedicated hardware. In this case, the dedicated hardware operates under control of the CPU 401.

A process procedure to be performed by the information processing apparatus 40 will be described below with reference to FIG. 5. The process illustrated in FIG. 5 starts, for example, in response to an instruction input by a user. Timing for starting the process of FIG. 5 is however not limited to this timing.

Figure 5:
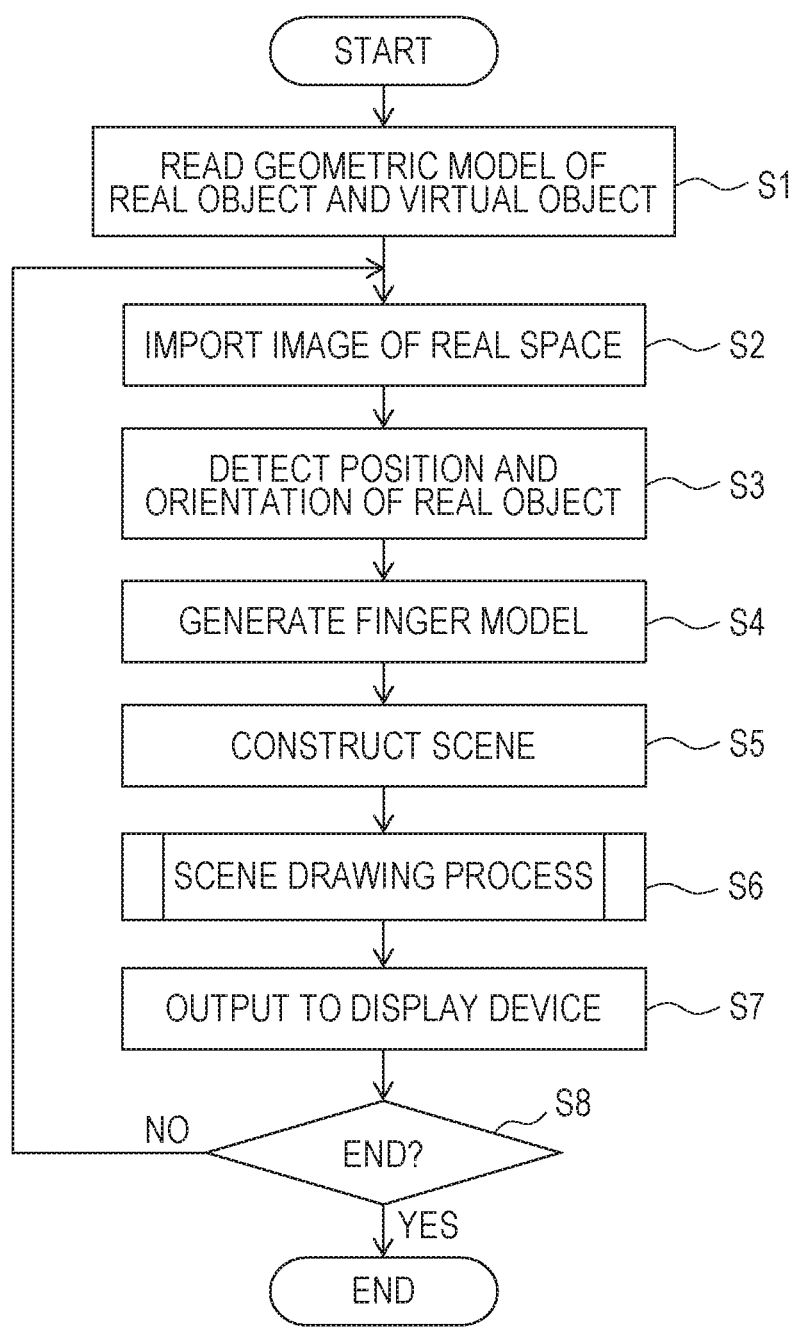
FIG. 5 is a flowchart illustrating an operation of the information processing apparatus.

The information processing apparatus 40 can implement the process illustrated in FIG. 5 when the CPU 401 reads and executes the program. As described above, however, the information processing apparatus 40 illustrated in FIG. 1 may be configured such that the process of FIG. 5 is implemented by at least part of elements of the information processing apparatus 40 operating as dedicated hardware. In this case, the dedicated hardware operates under control of the CPU 401 of the information processing apparatus 40. Note that hereinafter, a letter of the alphabet S means a step in the flowchart.

To begin with, in S1, the scene construction unit 43 reads the geometric model of the real object 50 and the data of the virtual object 60 stored in the data storing unit 44. The position and orientation detection unit 41 reads the attachment position and orientation of the marker 51 with respect to the real object 50 stored in the data storing unit 44. Next, in S2, the position and orientation detection unit 41 imports the image of real space captured by the image capturing unit 21 of the image capturing device 20 via the input I/F 404.

In S3, the position and orientation detection unit 41 detects the position and orientation of the marker from the image of real space acquired in S2. The position and orientation detection unit 41 then detects the position and orientation of the real object 50 based on the detected position and orientation of the marker 51 and the attachment position and orientation of the marker 51 read from the data storing unit 44 in S1.

In S4, the finger model generation unit 42 extracts the user's finger area from the image of real space acquired in S2, and then generates the finger model. In S5, the scene construction unit 43 constructs the scene (virtual space). To begin with, the scene construction unit 43 places, on the scene, the geometric model of the real object 50 and the geometric model of the virtual object 60 read from the data storing unit 44 in S1, based on the position and orientation of the real object 50 detected in S3. The scene construction unit 43 further places, on the scene, the finger model generated in S4 in alignment with the user's finger area. It is assumed that a virtual viewpoint to draw the scene agrees with the position and orientation of the image capturing device 20.

In S6, the scene drawing unit 46 performs a scene drawing process for drawing the scene constructed in S5 in a drawing form according to a determination result made by the hold determination unit 45 and generating the MR image. Details of the scene drawing process will be described later. In S7, the scene drawing unit 46 outputs the MR image generated in S6 to the display device 30 via the output I/F 405. In S8, the information processing apparatus 40 determines whether to end the process, for example, based on whether the user inputs an instruction to end the process. Then, upon determination to end the process, the information processing apparatus 40 ends the process of FIG. 5 as it is. On the other hand, upon determination to continue the process, the information processing apparatus 40 returns to S2 in order to perform the process for the next frame (image).

Figure 6:
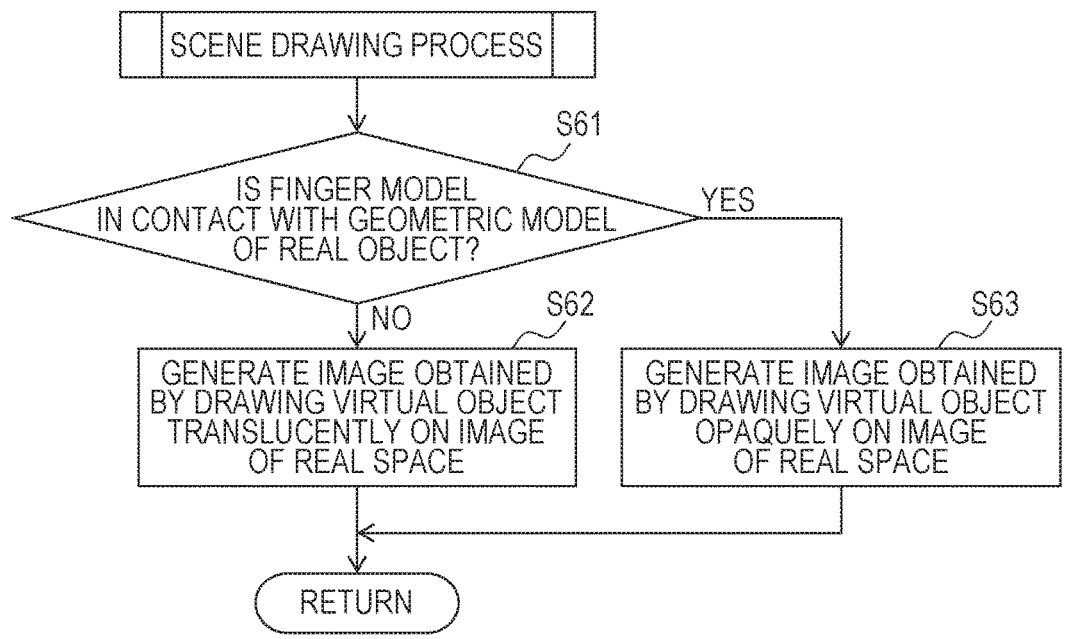
FIG. 6 is a flowchart illustrating a flow of a scene drawing process.

FIG. 6 is a flowchart illustrating a specific procedure of the scene drawing process to be performed in S6 of FIG. 5.

In S61, the hold determination unit 45 make a contact determination between the geometric model of the real object 50 and the user's finger model placed in the scene constructed in S5 of FIG. 5. The hold determination unit 45 makes the contact determination by using the following procedure based on the geometric model of the real object 50 and the finger model placed in the scene, and each position and orientation. To begin with, the hold determination unit 45 takes out triangular polygons one by one that constitutes each model, and then determines whether the triangular polygons intersect. The hold determination unit 45 makes this determination on all combinations of the triangular polygons. When the triangular polygons of at least one of the combinations intersect, the hold determination unit 45 determines that the models interfere with each other, that is, the models are in contact with each other. A method of implementing the contact determination in the present embodiment is however not limited to the above method.

Upon determination in S61 that the geometric model of the real object 50 and the finger model are not in contact with each other, the hold determination unit 45 determines that the user is not holding the real object 50, and proceeds to S62. On the other hand, upon determination in S61 that the geometric model of the real object 50 and the finger model are in contact with each other, the hold determination unit 45 determines that the user is holding the real object 50, and proceeds to S63.

In S62, the scene drawing unit 46 draws the virtual object 60 placed in the scene constructed in S5 of FIG. 5 in the translucent drawing form. Specifically, the scene drawing unit 46 makes the virtual object 60 translucent by increasing transparency of the material data, and then draws the virtual object 60 on the image of real space acquired in S2 of FIG. 5. This leads to generation of the MR image to be displayed on the display unit 31 of the display device 30 when it is determined that the user is not holding the real object 50. The MR image generated at this time is an image that allows the user to recognize both the shape of the real object 50 and the shape of the virtual object 60, as illustrated in FIG. 3A.

The MR image as illustrated in FIG. 3A allows the user to recognize that the virtual object 60 of what shape is located at which position, and to understand that the position and orientation of the virtual object 60 can be operated by holding the real object 50 of what shape. However, in the MR image illustrated in FIG. 3A, the virtual object 60 is drawn in a different appearance (translucent) from the prearranged drawing form (opaque), and thus visibility of the virtual object 60 decreases.

Meanwhile, in S63, the scene drawing unit 46 draws the virtual object 60 placed in the scene constructed in S5 of FIG. 5 in the prearranged drawing form. Specifically, the scene drawing unit 46 draws the virtual object 60 on the image of real space acquired in S2 of FIG. 5 based on the material data of the virtual object 60 at a time of reading in S1 of FIG. 5. That is, the scene drawing unit 46 draws the virtual object 60 opaquely. This leads to generation of the MR image to be displayed on the display unit 31 of the display device 30 when it is determined that the user is holding the real object 50.

The MR image generated at this time is, as illustrated in FIG. 3B, an image obtained by drawing the virtual object 60 opaquely. This MR image is higher than the MR image illustrated in FIG. 3A in visibility of the virtual object 60, and allows the user to easily observe the virtual object 60. In the MR image illustrated in FIG. 3B, however, the virtual object 60 hides part or all of the real object 50, and the shape of the real object 50 cannot be recognized. Therefore, with this MR image, it is difficult for the user to recognize that the real object 50 of what shape is located at which position, and it is difficult to hold the real object 50. Therefore, the present embodiment presents the MR image illustrated in FIG. 3B only when the user is holding the real object 50.

As described above, the information processing apparatus 40 in the present embodiment determines whether the user is holding the real object 50. Depending on the determination result, the information processing apparatus 40 switches the drawing form of the image of the virtual object 60 to be superimposed on the real object 50 at the position and orientation corresponding to the position and orientation of the real object 50. Specifically, upon determination that the user is holding the real object 50, the information processing apparatus 40 performs display control to display the image of the virtual object 60 on the display unit 31 in the drawing form in which the virtual object 60 can be observed. On the other hand, upon determination that the user is not holding the real object 50, the information processing apparatus 40 performs display control to display the image of the virtual object 60 on the display unit 31 in the drawing form in which the shape of the real object 50 and the shape of the virtual object 60 can be recognized.

Here, the drawing form in which the virtual object 60 can be observed can be a form in which the virtual object 60 is drawn opaquely. Meanwhile, the drawing form in which the shape of the real object 50 and the shape of the virtual object 60 can be recognized can be a form in which the virtual object 60 is drawn translucently. These forms make it possible, until the user holds the real object 50, to maintain a state where the shape of the real object 50 can be recognized, regardless of a distance between the region of the user's body (hand) and the real object 50. Therefore, the user can perform an approaching operation for holding the real object 50 appropriately, and easily grip the real object 50. At this time, the user can recognize not only the shape of the real object 50 but also the shape of the virtual object 60. Therefore, by holding the real object 50, the user can easily understand that the virtual object 60 of what shape can be operated.

Then, when the user holds the real object 50, the information processing apparatus 40 switches to a state where the virtual object 60 can be observed. Therefore, it is possible to avoid a state where the real object 50 remains observable even after the user holds the real object 50. In a state where the user is holding the real object 50, the virtual object 60 becomes opaque, and the user can observe the virtual object 60 including not only the shape of the virtual object 60 but also color, texture, and the like. Thus, since the user can observe the virtual object 60 having high visibility, the user can obtain a good feeling of absorption.

As described above, since the information processing apparatus 40 can present, to the user, the shape of the real object 50 only when necessary, the information processing apparatus 40 can achieve improvement in operativity of the real object 50 on which the virtual object 60 is superimposed, and an increase in evaluation efficiency of workability using the virtual object 60.

When making a hold determination of whether the user is holding the real object 50, the information processing apparatus 40 determines whether the region of the user's body (hand) and the real object 50 are in contact with each other. Upon determination that the region of the user's body and the real object 50 are in contact with each other, the information processing apparatus 40 determines that the user is holding the real object 50. With this determination, when the region of the user's body is only approaching the real object 50 and is not actually holding the real object 50, the information processing apparatus 40 can maintain the state where the shape of the real object 50 can be recognized. Therefore, the information processing apparatus 40 can switch the drawing form of the virtual object 60 at appropriate timing.

When making the contact determination between the region of the user's body and the real object 50, the information processing apparatus 40 acquires the geometric model obtained by modeling the shape of the real object 50 and the geometric model obtained by modeling the shape of the region of the user's body (finger model). Specifically, the information processing apparatus 40 acquires the geometric model of the real object 50 from the data storing unit 44 and acquires (generates) the finger model by performing image processing on the image of real space. Also, the information processing apparatus 40 places the geometric model of the real object 50 and the finger model on virtual space in association with the position and orientation of the real object 50 and the user's hand detected based on the image of real space.

The information processing apparatus 40 then makes the contact determination between the region of the user's body and the real object 50 by making a contact determination between the geometric models placed on virtual space. Thus, since the information processing apparatus 40 makes the contact determination using the geometric model of the region of the user's body and the geometric model of the real object 50, the information processing apparatus 40 can determine appropriately whether the region of the user's body and the real object 50 are in contact with each other.

As described above, the information processing apparatus 40 of the present embodiment can present the MR image that allows the user to easily recognize the shape of the real object before holding the real object, and to easily observe the virtual object after holding the real object. With this configuration, when evaluating workability such as ease of construction and ease of maintenance, the information processing apparatus 40 can present, to the user, an image that allows the user to easily hold the real object and to easily observe the virtual object during work. Therefore, evaluation can be performed efficiently.

Next, a second embodiment of the disclosure will be described.

The above-described first embodiment has described a case where the hold determination is made based on the contact determination between the geometric model of the real object 50 and the geometric model of the region of the user's body (finger model). This second embodiment describes a case where a hold determination is made based on a movement determination of a real object 50.

Figure 7:
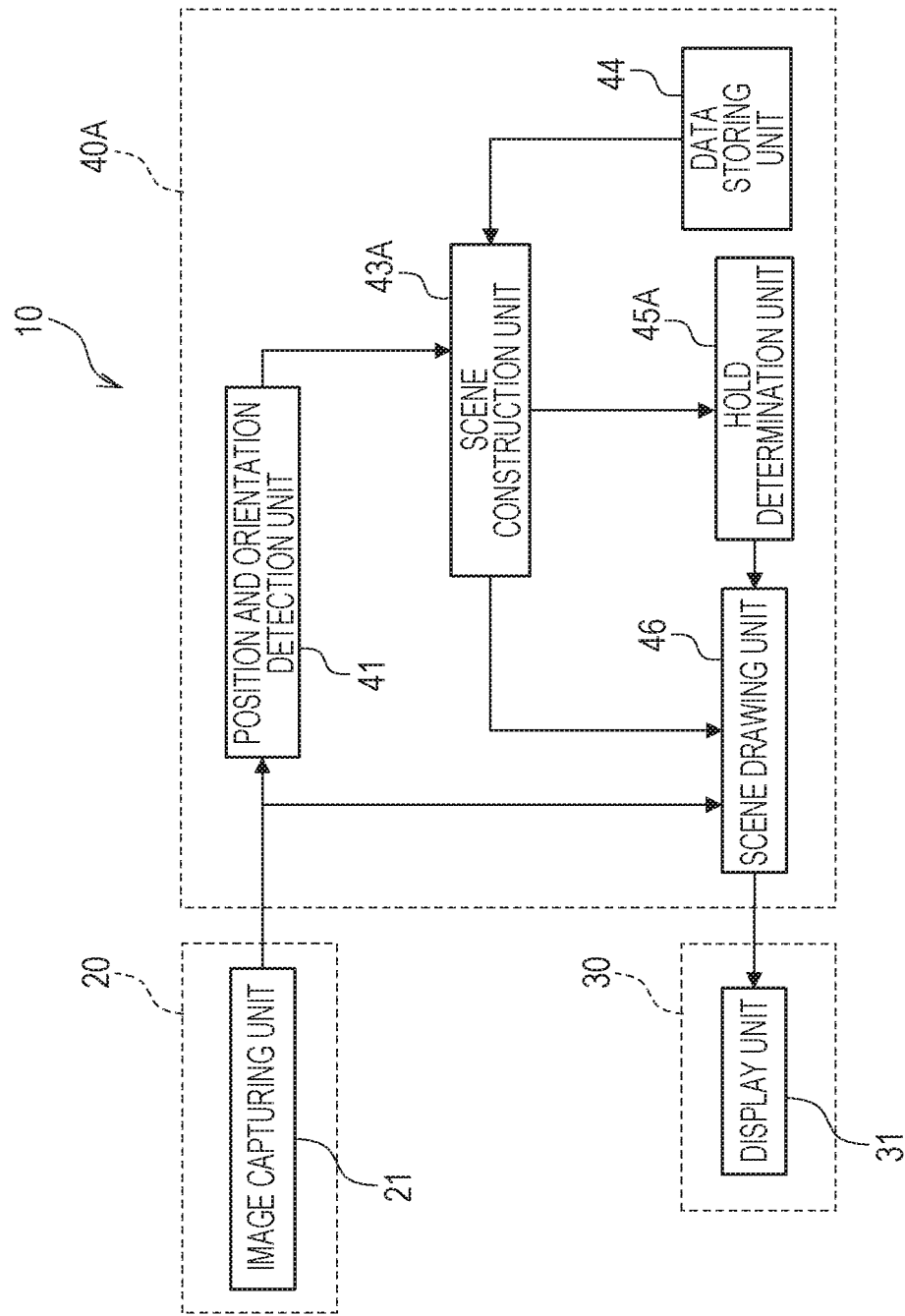
FIG. 7 is a diagram illustrating a functional configuration of a mixed reality system in a second embodiment.

FIG. 7 is a block diagram illustrating a configuration of an MR system 10 in the present embodiment. In this FIG. 7, parts having configurations similar to FIG. 1 are denoted with the same reference signs as FIG. 1, and the following mainly describes parts with different configurations.

Since an information processing apparatus 40A in the present embodiment does not need to generate a finger model as in the first embodiment, as illustrated in FIG. 7, the information processing apparatus 40A has a configuration with the finger model generation unit 42 eliminated from the information processing apparatus 40 of FIG. 1. In the information processing apparatus 40A, configurations of a scene construction unit 43A and a hold determination unit 45A differ from configurations of the scene construction unit 43 and the hold determination unit 45 of the information processing apparatus 40 of FIG. 1.

In a manner similar to the scene construction unit 43, the scene construction unit 43A places, on a scene, a geometric model of the real object 50 and a geometric model of a virtual object 60 read from a data storing unit 44 based on a position and orientation of the real object 50. The scene construction unit 43A however does not perform a process of placing the finger model on the scene like the scene construction unit 43.

The hold determination unit 45A determines whether a user is holding the real object 50 by determining whether the real object 50 is moving. Specifically, the hold determination unit 45A determines whether the user is holding the real object 50 by determining whether the position and orientation of the real object 50 are changing. In the present embodiment, the information processing apparatus 40A acquires a plurality of images of real space continuously captured on a time-series basis. Based on the acquired plurality of images of real space, the information processing apparatus 40A detects the position and orientation of the real object 50. The information processing apparatus 40A then determines whether the position and orientation of the real object 50 are changing, and determines that the user is holding the real object 50 when the position and orientation are changing.

The information processing apparatus 40A performs the process illustrated in FIG. 5 excluding S4 for generating the finger model (S1 to S3, S5 to S8). However, in S5, unlike the first embodiment, the scene construction unit 43A does not perform the process of placing the finger model on the scene.

Also, the scene drawing process in S6 differs from the scene drawing process of the first embodiment.

Figure 8:
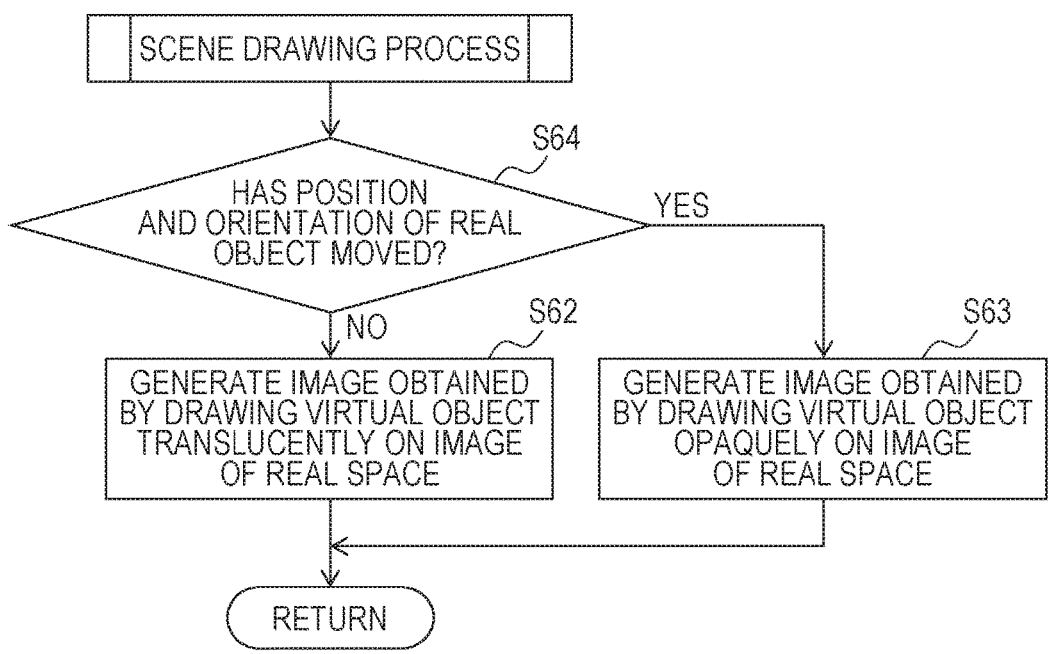
FIG. 8 is a flowchart illustrating a flow of a scene drawing process of the second embodiment.

FIG. 8 is a flowchart illustrating a specific procedure of the scene drawing process to be performed in S6. Note that in FIG. 8, steps in which the same process as in FIG. 6 is performed are denoted with the same step numbers, and the following mainly describes steps with different processes.

In S64, the hold determination unit 45A makes a movement determination of the real object 50. The hold determination unit 45A stores N frames of position and orientation of the real object 50 detected in S3 of FIG. 5, and then determines where there is a change in the stored position and orientation. Here, N is an integer equal to or greater than 2. When an amount of change in the position and orientation is equal to or greater than a predetermined threshold, the hold determination unit 45A can determine that there is a change in the position and orientation. Note that the threshold may be any value equal to or greater than 0. When there is a change in the position and orientation, the hold determination unit 45A determines that the real object 50 is moving, whereas when there is no change in the position and orientation, the hold determination unit 45A determines that the real object 50 is not moving. A method of implementing the movement determination is however not limited to the above method.

Upon determination in S64 that the real object 50 is not moving, the hold determination unit 45A determines that the user is not holding the real object 50, and proceeds to S62. On the other hand, upon determination in S64 that the real object 50 is moving, the hold determination unit 45A determines that the user is holding the real object 50, and proceeds to S63.

As described above, the information processing apparatus 40A in the present embodiment determines whether the user is holding the real object 50 by determining whether the real object 50 is moving.

When making the movement determination of the real object 50, the information processing apparatus 40A acquires a plurality of images of real space continuously captured on a time-series basis. Based on the acquired plurality of images of real space, the information processing apparatus 40A detects the position and orientation of the real object. The information processing apparatus 40A then determines whether the real object 50 is moving by determining whether there is a change in the position and orientation of the real object.

Thus, since the information processing apparatus 40A makes the hold determination based on whether there is any change in the position and orientation, as in the hold determination in the first embodiment described above, the information processing apparatus 40A does not need to place the geometric models on virtual space and make the contact determination between the geometric models. That is, the information processing apparatus 40A does not need to generate the finger model as in the first embodiment. Therefore, the information processing apparatus 40A can make the hold determination by a method that requires a smaller calculation amount than the above-described contact determination.

Next, a third embodiment of the disclosure will be described.

This third embodiment describes a case where a hold determination is made by using together the above-described contact determination in the first embodiment and the above-described movement determination in the second embodiment.

An information processing apparatus in the present embodiment has the same configuration as in the information processing apparatus 40 illustrated in FIG. 1, and performs the process of the flowchart illustrated in FIG. 5. The present embodiment however differs from the first embodiment in the scene drawing process in S6 of FIG. 5.

Figure 9:
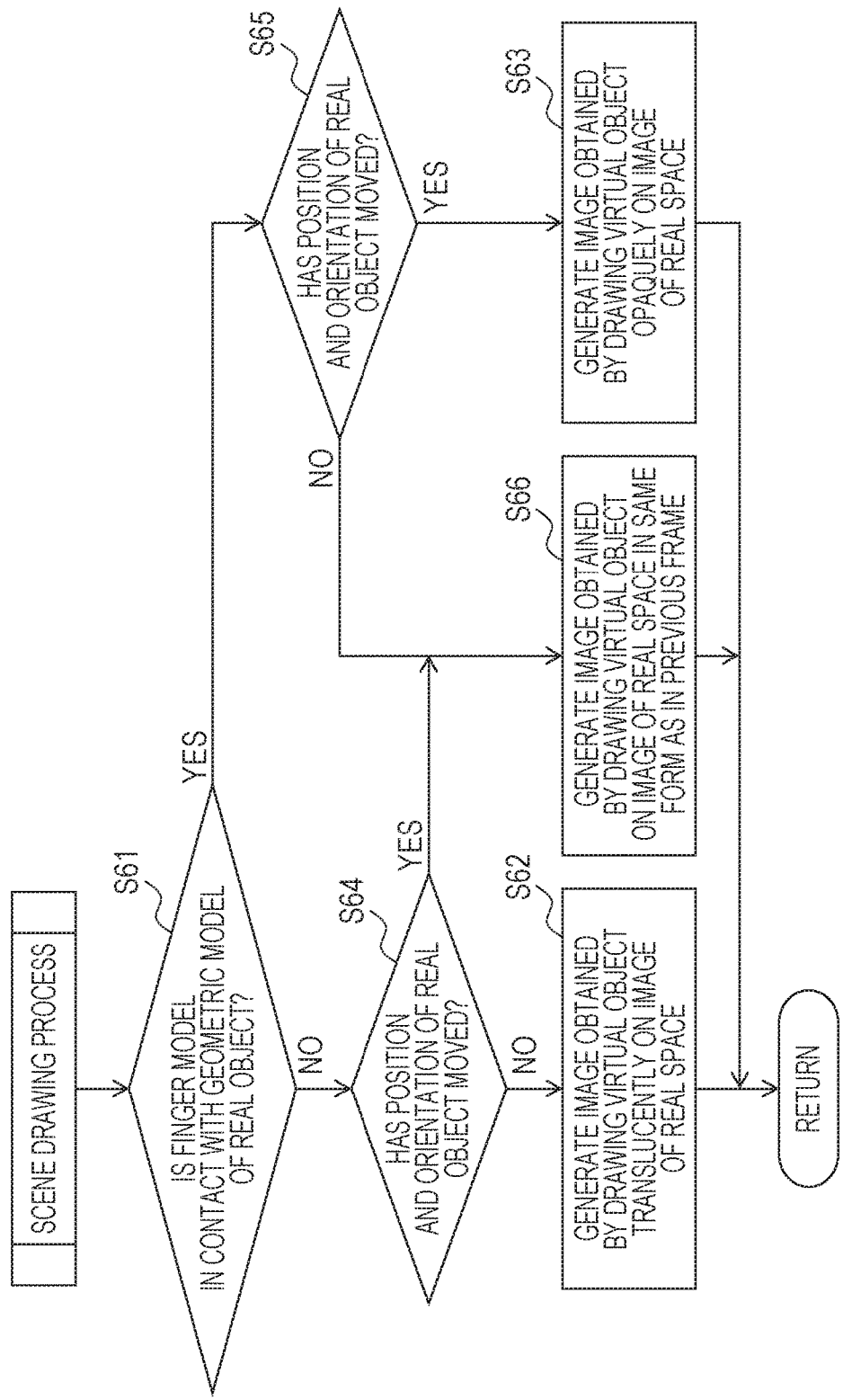
FIG. 9 is a flowchart illustrating a flow of a scene drawing process of a third embodiment.

FIG. 9 is a flowchart illustrating a specific procedure of the scene drawing process to be performed in S6. Note that in FIG. 9, steps in which the same process as in FIG. 6 or 8 is performed are denoted with the same step numbers, and the following mainly describes steps with different processes.

In S61, a hold determination unit 45 makes a contact determination between a geometric model of a real object 50 and a finger model as in the first embodiment. Then, as a result of the contact determination, when the hold determination unit 45 determines that a user is not in contact with the real object 50, the process proceeds to S64, whereas when the hold determination unit 45 determines that the user is in contact with real object 50, the process proceeds to S65.

In S64, the hold determination unit 45 makes a movement determination of the real object 50 as in the second embodiment. Then, as a result of the movement determination in S64, when the hold determination unit 45 determines that the real object 50 is not moving, the process proceeds to S62, whereas when the hold determination unit 45 determines that the real object 50 is moving, the process proceeds to S66. In S65, the hold determination unit 45 performs a process as in S64. Then, as a result of the movement determination in S65, when the hold determination unit 45 determines that the real object 50 is moving, the process proceeds to S63, whereas when the hold determination unit 45 determines that the real object 50 is not moving, the process proceeds to S66. In S66, a scene drawing unit 46 draws a virtual object 60 placed in a constructed scene in the same drawing form as in the previous frame.

That is, in the present embodiment, when a user's hand is not in contact with the real object 50 and the real object 50 is stationary, the hold determination unit 45 determines that the user is not holding the real object 50. The information processing apparatus 40A then generates and displays an MR image that allows the user to recognize a shape of the real object 50 and a shape of the virtual object 60 illustrated in FIG. 3A. This allows the information processing apparatus 40A to present, to the user, an image that allows the user to easily hold the real object 50.

Meanwhile, when the user's hand is in contact with the real object 50 and the real object 50 is moving, the hold determination unit 45 determines that the user is holding the real object 50. In this case, as illustrated in FIG. 3B, the information processing apparatus 40A makes the virtual object 60 opaque, and generates and displays an MR image that allows the user to observe the virtual object 60.

When the hold determination unit 45 fails to determine whether the user is holding the real object 50, the information processing apparatus 40A draws the virtual object 60 in the drawing form that is set based on a hold determination result of the previous frame. That is, when the process of S62 has been performed in the previous frame, the information processing apparatus 40A draws the virtual object 60 in a translucent drawing form in S66. Meanwhile, when the process of S63 has been performed in the previous frame, the information processing apparatus 40A draws the virtual object 60 in a prearranged drawing form in S66. Note that in the first frame, the information processing apparatus 40A may draw the virtual object 60 in the prearranged drawing form.

Here, an effect obtained by the process of S66 will be described. For example, when the user touches by hand and moves the real object 50, it is determined in S61 and S65 that the user is holding the real object 50, and the virtual object 60 is drawn in the prearranged drawing form in S63. Therefore, an image that appears just like the user is holding and moving the virtual object 60 is displayed to the user. From this state, it is assumed that the user moves his or her hand off in the air trying to check how the virtual object 60 appears when the user drops the virtual object 60. In this case, the real object 50 falls freely, leading to a situation where the hand is not in contact with the real object 50 but the real object 50 is moving. The process then proceeds to S66, and the prearranged drawing form that is the drawing form in the previous frame is maintained. Therefore, the user is continuously presented with an image that allows the user to easily observe the virtual object 60, and the user is properly allowed to look at how the virtual object 60 falls.

When the user is not in contact with the real object 50 and the real object 50 is stationary, it is determined in S61 and S64 that the user is not holding the virtual object 60, and the virtual object 60 is drawn in the translucent drawing form in S62. From this state, it is assumed that the user touches a surface of the real object 50, leading to a situation where the hand is in contact with the real object 50 but the real object 50 is not moving. The process then proceeds to S66, and the translucent drawing form that is the drawing form of the previous frame is maintained. Therefore, the user is continuously presented with an image that allows the user to easily hold the real object 50.

That is, only the hold determination based on the contact determination will lead to erroneous determination that the user is holding the real object 50 even if the user is in contact with but has not held the real object 50 yet. Also, only the hold determination based on the movement determination will lead to erroneous determination that the user is holding the real object 50 even if the real object 50 suspended with a thread is shaking. By using both the contact determination and the movement determination, the present embodiment makes it possible to avoid the erroneous determination as described above and to make the hold determination more accurately.

The above-described embodiments have described methods of increasing transparency of the material data as the translucent drawing form of the virtual object 60. However, the translucent drawing form is not limited to the above-described methods. The drawing form is used to at least generate the MR image that allows the user to recognize the shape of the real object 50 and the shape of the virtual object 60. For example, only an outline of the virtual object 60 may be drawn. Also, a portion where the virtual object 60 and the real object 50 overlap each other may be drawn in a predetermined color or pattern (a silhouette of the real object 50 is displayed in the virtual object 60). Furthermore, only a portion of the virtual object 60 that does not overlap the real object 50 may be drawn (part of the virtual object 60 is cut out and the real object 50 is displayed).

The above-described embodiments have described that when the hold determination unit 45 determines that the user has held the real object 50, the scene drawing unit 46 draws the virtual object 60 in the prearranged drawing form. However, after holding the real object 50, the user may adjust the holding method for a while, during which it draws the virtual object 60 in the translucent drawing form. Therefore, the scene drawing unit 46 may switch the drawing form of the virtual object 60 when a predetermined time period elapses after the determination result of the hold determination unit 45 changes.

Furthermore, the first and third embodiments have described that the contact determination is made between the user's hand and the real object 50 based on the contact determination between the geometric model of the real object 50 and the finger model. However, when the geometric model of the real object 50 is unknown, the contact determination with the finger model may be made by approximating the shape of the real object 50. For example, the shape of the real object 50 may be approximated by the shape of the virtual object 60, and the contact determination between the geometric model of the virtual object 60 and the finger model may be made.

Also, a distance between the position of the real object 50 and the position of the finger model may be calculated. When the calculated distance is less than a predetermined threshold, the hold determination unit 45 may determine that the real object 50 and the finger model are in contact with each other. When the calculated distance is equal to or greater than the predetermined threshold, the hold determination unit 45 may determine that the real object 50 and the finger model are not in contact with each other. Note that the threshold is set at a distance short enough to allow determination that the region of the user's body (hand) is in contact with the real object 50. This makes it possible to make a hold determination even when the geometric model of the real object 50 is unknown or when the finger model cannot be generated accurately.

The second and third embodiments have described a case where the movement determination of the real object 50 is made based on whether there is a change in the position and orientation of the real object 50. However, the method of implementing the movement determination is not limited to the above method. For example, a moving speed may be detected from the change in the position and orientation of the real object 50, and when the moving speed is equal to or greater than a predetermined threshold, the hold determination unit 45 may determine that the real object 50 is moving. On the other hand, when the moving speed is less than the predetermined threshold, the hold determination unit 45 may determine that the real object 50 is not moving. This makes it possible to avoid the real object 50 from being not displayed (the virtual object 60 from becoming opaque) in a situation where the user slightly touches the real object 50 and the position and orientation of the real object 50 shifts only slightly (situation where the user is not holding the real object 50 firmly).

Furthermore, the above-described embodiments have described a case where it is determined whether the user is holding the real object by hand. However, an object that holds the real object is not limited to a region of the user's body. For example, it may be determined whether the user is holding the real object by determining whether an instrument directly operated by the user or a robot arm or the like remotely operated by the user is holding the real object.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-234154, filed Dec. 1, 2016, which is hereby incorporated by reference herein in its entirety.

What is claimed is:

1. An apparatus comprising:
   at least one processor; and
   a memory coupled to the at least one processor, the memory having instructions that, when executed by the processor, perform operations as:
   a detection unit configured to detect a position and an orientation of a real object with respect to a viewpoint of a user;
   a determination unit configured to determine whether a part of the body of the user and the real object are in contact with each other; and
   a display control unit configured to display a virtual object corresponding to the real object based on the position and the orientation of the real object,
   wherein when it is determined that the part of the body of the user and the real object are not in contact with each other, the display control unit displays the virtual object in a first form in which a shape of the real object can be visually recognized, and
   when it is determined that the part of the body of the user and the real object are in contact with each other, the display control unit displays the virtual object in a second form in which the shape of the real object on which the virtual object is superimposed cannot be visually recognized.

2. The apparatus according to claim 1, wherein the first form is one of a form in which the virtual object is displayed translucently, a form in which an outline of the virtual object is displayed and a form in which a portion in which the virtual object and the real object overlap each other is displayed in a specified color or pattern.

3. The apparatus according to claim 1, wherein the second form is a form in which the virtual object is displayed opaquely.

4. The apparatus according to claim 1, further comprising a calculation unit configured to calculate a distance between the real object and the part of the body of the user,
   wherein when the distance is less than a threshold, the determination unit determines that the real object and the part of the body of the user are in contact with each other.

5. The apparatus according to claim 1, wherein the determination unit determines whether the part of the body of the user and the real object are in contact with each other based on whether the real object is moving.

6. The apparatus according to claim 5, wherein when the position and the orientation of the real object are changing or when a moving speed of the real object is equal to or greater than a threshold, the determination unit determines that the real object is moving.

7. The apparatus according to claim 1, wherein the display control unit switches a display form of the virtual object when a predetermined time period elapses after a determination result made by the determination unit changes.

8. An image processing method comprising:
   detecting a position and an orientation of a real object with respect to a viewpoint of a user;
   determining whether a part of the body of the user and the real object are in contact with each other; and
   displaying a virtual object corresponding to the real object based on the position and the orientation of the real object,
   wherein displaying the virtual object includes:
   when it is determined that the part of the body of the user and the real object are not in contact with each other, displaying the virtual object in a first form in which a shape of the real object can be visually recognized; and
   when it is determined that the part of the body of the user and the real object are in contact with each other, displaying the virtual object in a second form in which the shape of the real object on which the virtual object is superimposed cannot be visually recognized.

9. The method according to claim 8, wherein the first form is one of a form in which the virtual object is displayed translucently, a form in which an outline of the virtual object is displayed and a form in which a portion in which the virtual object and the real object overlap each other is displayed in a specified color or pattern.

10. The method according to claim 8, wherein the second form is a form in which the virtual object is displayed opaquely.

11. The method according to claim 8, further comprising calculating a distance between the real object and the part of the body of the user,
    wherein when the distance is less than a threshold, the determining determines that the real object and the part of the body of the user are in contact with each other.

12. The method according to claim 8, wherein the determining determines whether the part of the body of the user and the real object are in contact with each other based on whether the real object is moving.

13. A non-transitory computer-readable storage medium storing a program for causing a computer to function as:
    a detection unit configured to detect a position and an orientation of a real object with respect to a viewpoint of a user;
    a determination unit configured to determine whether a part of the body of the user and the real object are in contact with each other; and a display control unit configured to display a virtual object corresponding to the real object based on the position and the orientation of the real object, wherein when the determination unit determines that the part of the body of the user and the real object are not in contact with each other, the display control unit displays the virtual object in a first form in which a shape of the real object can be visually recognized, and when the determination unit determines that the part of the body of the user and the real object are in contact with each other, the display control unit displays the virtual object in a second form in which the shape of the real object on which the virtual object is superimposed cannot be visually recognized.

14. The non-transitory computer-readable storage medium according to claim 13, wherein the first form is one of a form in which the virtual object is displayed translucently, a form in which an outline of the virtual object is displayed and a form in which a portion in which the virtual object and the real object overlap each other is displayed in a specified color or pattern.

15. The non-transitory computer-readable storage medium according to claim 13, wherein the second form is a form in which the virtual object is displayed opaquely.

16. The non-transitory computer-readable storage medium according to claim 13, wherein the determination unit determines whether the part of the body of the user and the real object are in contact with each other based on whether the real object is moving.

17. The non-transitory computer-readable storage medium according to claim 13, wherein the display control unit switches a display form of the virtual object when a predetermined time period elapses after a determination result made by the determination unit changes.

* * * * *